(12) United States Patent
Uchiyama

(10) Patent No.: US 6,172,762 B1
(45) Date of Patent: Jan. 9, 2001

(54) PRINTER SYSTEM WITH POWER-UP CONTROLLER

(75) Inventor: Tadamitsu Uchiyama, Ebina (JP)

(73) Assignee: Minolta Co., Ltd., Osaka (JP)

( * ) Notice: Under 35 U.S.C. 154(b), the term of this patent shall be extended for 0 days.

(21) Appl. No.: 08/207,370

(22) Filed: Mar. 7, 1994

(30) Foreign Application Priority Data

Mar. 10, 1993 (JP) .................................................. 5-049676
Mar. 2, 1994 (JP) .................................................. 6-032091

(51) Int. Cl.[7] .................................................. G05B 11/01
(52) U.S. Cl. .......................... 358/1.14; 358/1.15; 700/12
(58) Field of Search .................................. 395/107, 114, 395/113, 101; 355/204–207; 219/216; 713/310; 358/1.14, 1.15; 700/12

(56) References Cited

U.S. PATENT DOCUMENTS 3,593,151 * 7/1971 Veale ........................................ 455/228
4,480,314 * 10/1984 McKelley, Jr. et al. ................. 364/400
4,740,096 * 4/1988 Nakanishi ............................... 400/663
4,996,467 * 2/1991 Day ......................................... 318/480
5,369,469 * 11/1994 Leo et al. ................................. 395/114
5,381,242 * 1/1995 Fujii ........................................ 358/468
5,396,443 * 3/1995 Mese et al. ............................. 364/707
5,397,890 * 3/1995 Schueler et al. ........................ 250/221
5,918,060 * 6/1999 Jeong ................................. 395/750.06

FOREIGN PATENT DOCUMENTS 62-187874   8/1987   (JP) .
 3-46022    2/1991   (JP) .

* cited by examiner

Primary Examiner—Dwayne D. Bost
Assistant Examiner—Tracy M Legree
(74) Attorney, Agent, or Firm—Sidley & Austin

(57) ABSTRACT

A printer system has a computer, a printer disposed separately of the computer for forming an image on a recording paper in compliance with image data received from the computer, and recognizing apparatus for recognizing a start of operation of the computer, the printer incorporating a setting apparatus for setting the printer in a state capable of producing a printing operation when the start of operation of the computer is recognized by the recognizing apparatus, thus permitting a printing operation with only a small operational rise time.

10 Claims, 11 Drawing Sheets

FIG. 4A PRINTER POWER SOURCE ON

FIG. 4B C1 HEATER ON COMMAND

FIG. 4C HEATER OPERATION

FIG. 4D R1 FIXING TEMPERATURE READY

FIG. 4E C2 PRINTING COMMAND

FIG. 4F C3 IMAGE DATA

FIG. 4G C4 HEATER OFF COMMAND

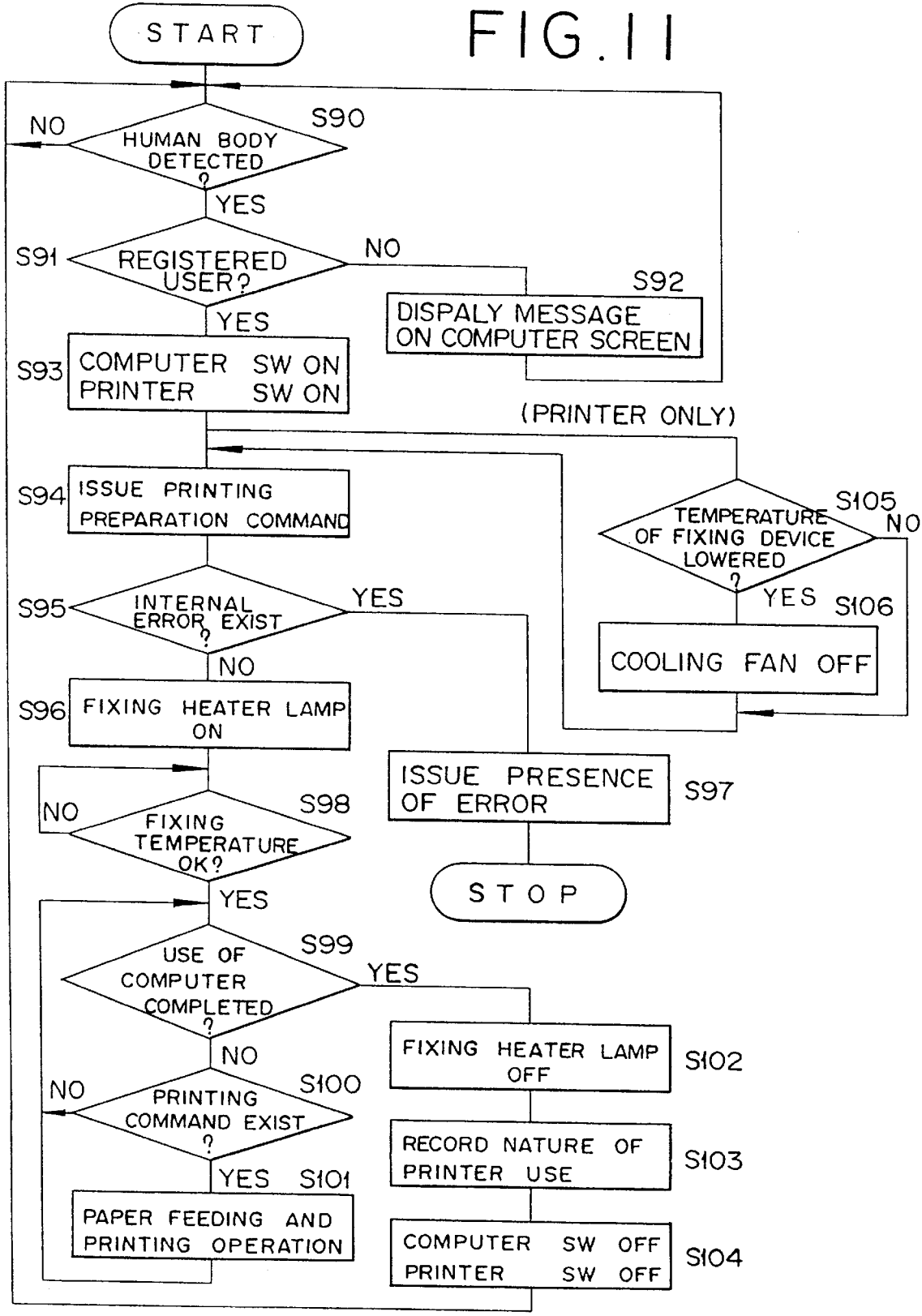

PRINTER SYSTEM WITH POWER-UP CONTROLLER

BACKGROUND OF THE INVENTION

This invention relates to a printer system for controlling a thermal fixing device which is provided as in a laser beam printer.

In recent years, the laser beam printers have been finding popular acceptance as means for printing character information and image information. The printers of this class are provided with a thermal fixing device for thermally fixing an image formed on a recording paper. As a heat source for the thermal fixing device, a heater lamp may be cited for example. By reason of heavy consumption of electric power, for example, and with due regard to the saving of energy, this heater lamp is controlled so as to decrease the supply of electric power to a level enough for retaining the heater lamp in a warm state or to suspend the supply while the heater lamp is not in use. Though this control is indeed effective in economizing the use of energy, it is on the contrary at a disadvantage in lacking the instantaneousness with which the printing operation is started immediately after the issuance of a command to print.

For the elimination of this disadvantage, therefore, the invention disclosed in JP-A-62-187,874, for example, contemplates starting the supply of electric power to the thermal fixing device on the condition that opposite communication channels are opened as when image data are transmitted from a host computer to a printer. Even this technique has a problem of incapability of immediately setting the printer to operation. To be specific, the operation of this technique entails a problem of inevitable attendance of an operator at the site of operation because the heating of the fixing device is started as triggered by the data transmitted immediately before the printing and, therefore, the time required for the reception of the data is relatively short.

The technique reported at pages 130 to 133 of the Sep. 13, 1993 issue of the "Nikkei Electronics," is aimed at curtailing the rise time by using a film fixing device having a small thermal capacity or curtailing the rise time of a heat roller type fixing device by varying a raw material for the roller or halving the wall thickness of the roller. Since these conventional techniques invariably entail a decrease in the thermal capacity of the relevant heating part, they tend to impair the evenness of heating and necessitate accurate control of temperature.

SUMMARY OF THE INVENTION

An object of this invention consists in providing a printer system which is capable of enabling even a printer of the type which is provided with a thermal fixing device requiring a rise time to produce an apparent decrease in the rise time of the thermal fixing device and permit a user of the printer to produce a printing operation involving only a small rise time and excelling in instantaneousness.

To accomplish this object, the present invention provides a printer system comprising a computer, a printer disposed separately of the computer and adapted to form an image on a recording paper in compliance with image data received from the computer, and recognizing means for recognizing a start of operation of the computer, the printer incorporating therein setting means for setting the printer in a state capable of producing a printing operation when the start of operation of the computer is recognized by the recognizing means.

The other objects and effects of this invention will become apparent from the following detailed description of the invention.

BRIEF DESCRIPTION OF THE DRAWINGS

FIG. 4 is a timing chart illustrating the state of operation of the device shown in FIG. 2.

FIG. 11 is a operation flow chart of the embodiment of FIG.10.

DETAILED DESCRIPTION OF THE INVENTION

Now, this invention will be described below with reference to some embodiments illustrated in the accompanying drawings.

Figure 1:
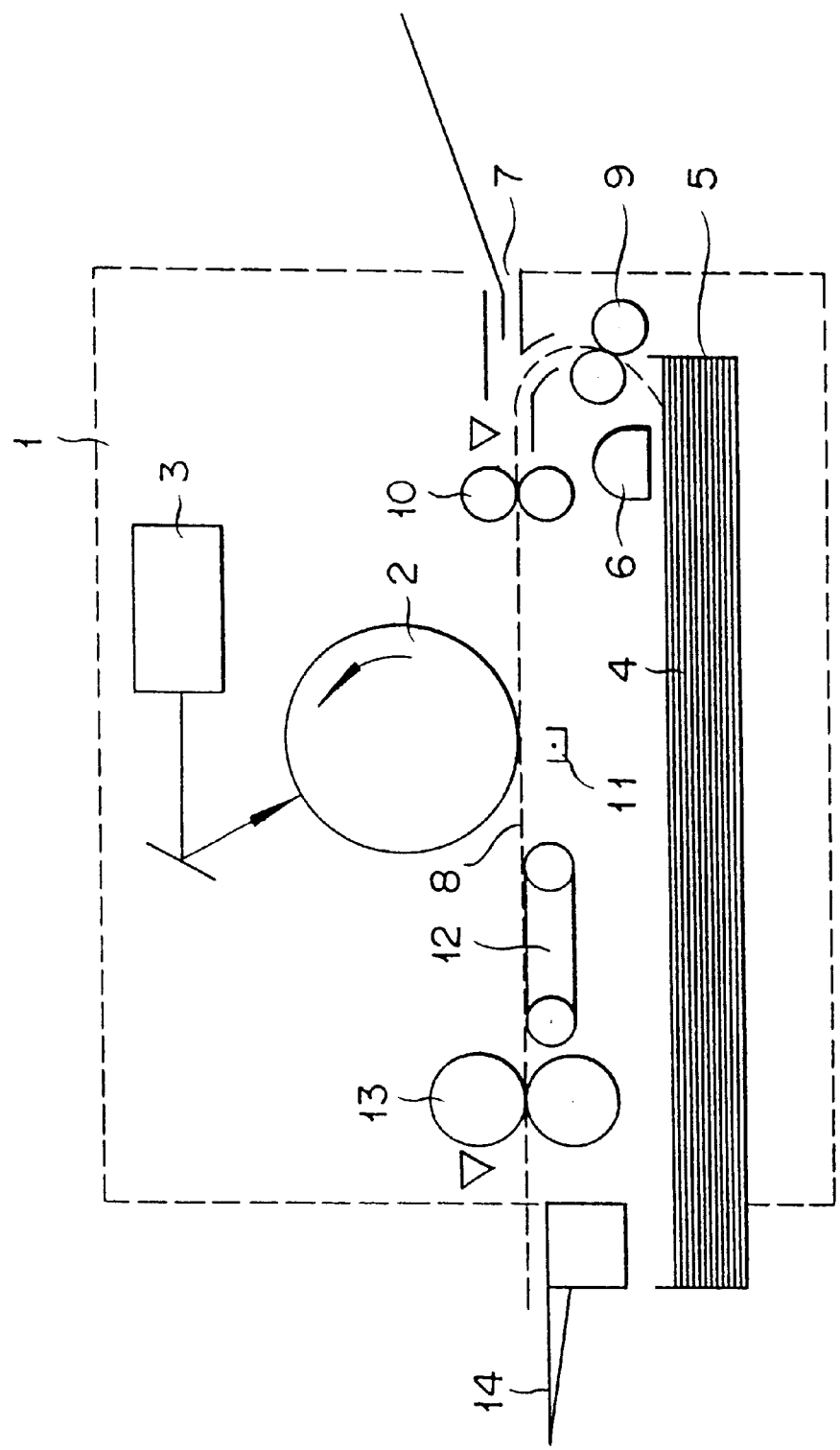
FIG. 1 is a schematic structural drawing of a laser beam printer to be used in a printer system of this invention.

FIG. 1 is a schematic structural drawing illustrating one example of the laser beam printer to be used in the printer system contemplated by this invention. In the central part of a laser beam printer 1, a photosensitive member 2 of the shape of a drum is disposed. The beam from a laser 3 modulated based on image data is projected on the photosensitive member 2. As a result, an electrostatic latent image is formed on the surface of the photosensitive member 2. A charging device, a developing device, a transfer device, a cleaning device, a charge releasing device, etc. which are omitted from illustration are disposed around the photosensitive member 2 and are operated to carry out an electrostatic process as conventionally practiced. Recording papers 4 are fed out of a cassette 5 by a paper feeding roller 6 or fed in manually through a manual paper feeding mouth 7 and then are forwarded by conveying rollers 9, 10 in a recording paper conveying path 8 into a transfer part 11. In the transfer part 11, a recording paper 4 onto which a toner image has been transferred is conveyed by a conveying belt 12, passed through a thermal fixing device 13 provided with a pair of rollers to have the toner image fixed thereon, and discharged into a tray 14. The thermal fixing device 13 is provided therein with a built-in fixing heater lamp adapted to heat rollers. This thermal fixing device 13 is energized by a controller which will be specifically described afterward.

The laser beam printer 1 which is constructed as described above is connected, as illustrated in FIG. 2, for example, to a computer (personal computer) 20, an external device, through the medium of a cable 23 which is provided at the opposite ends thereof with connectors 21, 22.

To the computer 20, a keyboard 25 having various keys 24 arranged thereon is connected through the medium of a cable 26. Through this keyboard 25, various instructions are issued to the computer 20.

The laser beam printer 1 is provided with a controller 30 for translating instructions transmitted from the computer 20 into corresponding words of the language for the operation of the printer and an internal sequence controlling circuit 31 for controlling the operation of a mechanical part of the laser beam printer 1. The controller 30 and the internal sequence controlling circuit 31 are interconnected by an internal connector as illustrated in the drawing.

Figure 3:
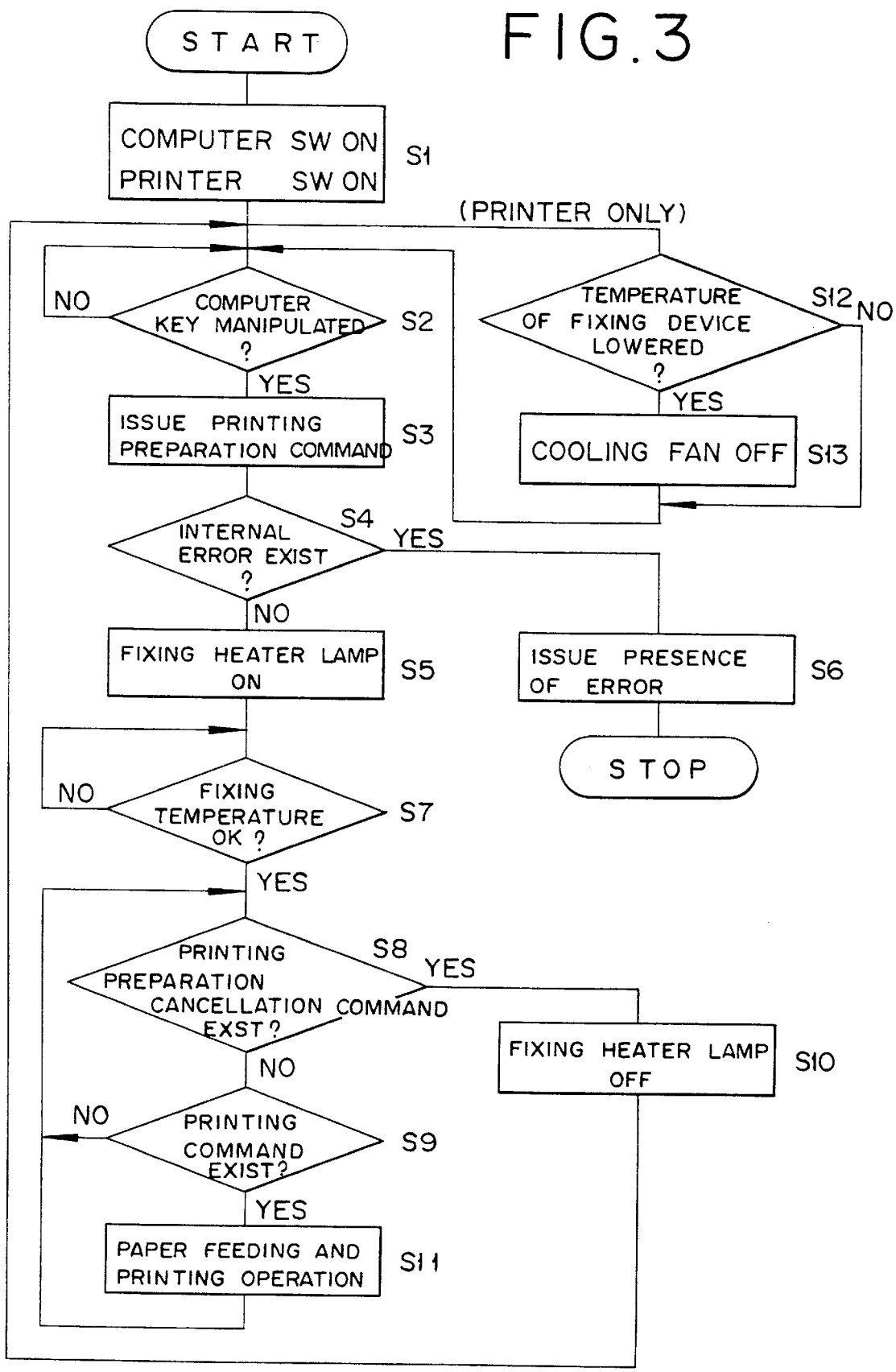
FIG. 3 is a flow chart of the operation of the device shown in FIG. 2.

Now, one example of the control of the thermal fixing device in the printer system constructed as described above will be described in detail below with reference to the flow chart of FIG. 3 and the timing chart of FIG. 4.

First, it is presumed that the power sources respectively for the computer 20 and the laser beam printer 1 have been already turned on (printer power source ON as illustrated in FIG. 4). Now, the computer 20 and the laser beam printer 1 are both in a waiting state and are issuing a command to cancel printer ready or a command for heater OFF as will be specifically described afterward (S1). When the user manipulates any of the keys 24 which are arranged on the keyboard 25 while the system is in the ensuant state, the computer 20 recognizes the manipulation through the medium of the cable 26 and issues a command to prepare for printing via the cable 23 to the laser beam printer 1 (S2, S3). The controller 30 of the laser beam printer 1 which has received this command to prepare for printing, on the condition that he printer has no internal error, issues a command to start energizing the thermal fixing device 13 (heater ON command illustrated in FIG. 4) via a C1 terminal of an internal connector 33 to the internal sequence controlling circuit 31 to supply electric power to the fixing heater lamp and start heating. No electric power is supplied to the thermal fixing device 13 until this command is issued. After the reception of this command, the controller 30 carries out ON-OFF control (heater operation illustrated in FIG. 4) for keeping the temperature of the thermal fixing device 13 at a prescribed level (about 180° C.) (S4, S5).

When the presence of an internal error of printer is confirmed at the step of S4, since any further processing is meaningless, the controller 30 issues information on the confirmed presence of the internal error via the cable 23 to the computer 20 and stops the processing (S6).

When the supply of electric power to the thermal fixing device 13 is started and the temperature of the thermal fixing device 13 is eventually elevated to the prescribed level, the laser beam printer 1 causes an RI terminal of the internal connector 33 to emit a signal of HI (refer to the fixing temperature ready in FIG. 4) and waits for emission of a command to print from the computer 20 (S7–S9). When a command to cancel the preparation for printing is issued while the laser beam printer 1 is in the waiting state, the controller 30 transmits a heater OFF command as illustrated in FIG. 4 via a C4 terminal of the internal connector 33 to the internal sequence controlling circuit 31 to stop the supply of electric power to the fixing heater lamp (S10). When a command to print is issued from the computer 20 to the laser beam printer 1 after the thermal fixing device 13 has been heated to a prescribed temperature, this command is forwarded through a C2 terminal of the internal connector 33 and injected into the internal sequence controlling circuit 31 and image data are supplied from a C3 terminal of the same connector 33. When the supply of the image data is completed, the paper feeding roller 9 is set to motion and the recording paper 4 is conveyed and the image data are printed on the recording paper 4 through the well-known electrostatic process (S11).

Since the energization of the thermal fixing device 13 is controlled as described above, the thermal fixing device 13 assumes an initiating state without the user's knowledge and immediately produces a printing operation on receiving the command to print after the elapse of an interim of some tens of seconds between the time the key 24 is manipulated and the time the command to print is issued. In short, the rise time of the thermal fixing device 13 is apparently shortened and the printing is promptly performed on the part of the user. A waiting time of the order of 30 seconds arises when the interim preceding the issuance of the command to print is only 20 to 30 seconds. Even this waiting time turns out to be apparently short as compared with the waiting time which is involved when the heating of the thermal fixing device 13 is started after the reception of the image data.

When the manipulation of the key 24 does not occur within a prescribed interval following the completion of the printing, the computer 20 automatically proceeds to issue a command to cancel the preparation for printing. The laser beam printer 1, on receiving this command, issues a heater OFF command to the internal sequence controlling circuit 31 and stops the supply of electric power to the fixing heater lamp. When the energization of the fixing heater lamp is stopped as described above, a cooling fan not shown in the drawing is turned off (S12, S13) on the condition that the temperature of the thermal fixing device 13 has been lowered below a prescribed level. The operations of Step 12 and Step 13 are independently carried out in the laser beam printer 1. The cooling fan is constantly controlled so as to be turned on when the temperature of the thermal fixing device 13 exceeds a prescribed level and turned off when the temperature falls short of the prescribed level.

In consequence of the operation described above, the waiting time which the laser beam printer 1 spends before the start of printing can be curtailed because the rise time of the thermal fixing device 13 is curtailed apparently as described above. Further, since the operations described above can be fully coped with by such alterations as are needed to be made in the program for permitting recognition of the manipulation of the key 24 and consequently effecting issuance of a command to prepare for printing or a command to cancel preparation for printing, the hardware construction of the existing apparatus does not need to be changed at all and the influence of increase of cost can be minimized. The curtailment of the rise time of the thermal fixing device 13 does not tend to impair the evenness of heating because it is an apparent phenomenon after all and not an outcome of a decrease in the thermal capacity.

Further, the fact that the supply of electric power to the thermal fixing device 13 is automatically suspended while the device 13 is not in use promotes the saving of energy and, on account of a decrease in emission of heat, lends itself to the elongation of service life of the thermal fixing device 13. The printer system is further satisfactory in terms of quietness because the cooling fan is automatically turned off when the temperature of the thermal fixing device 13 falls below a stated level.

The embodiment described thus far represents a case of enabling the supply of electric power to the thermal fixing device 13 to be started by the manipulation of the key 24. Alternatively, the printer system may be so adapted that it starts the supply of electric power to the thermal fixing device 13 on recognizing the fact that a mouse is manipulated, the fact that the user has gained access to such memory device as a hard disc or a floppy disc, or the fact that the user has touched a touch panel of the touch panel type screen.

The embodiment described above is designed to control the supply of electric power to the thermal fixing device 13 on the basis of two commands, ie. a heater ON command and a heater OFF command. One signal line suffices to control the supply of electric power to the thermal fixing device 13 when the thermal fixing device 13 is so modified as to issue an ON command in case of HI level and an OFF command in case of LOW level. When these commands are encoded, the handling of such encoded commands can be attained by borrowing some other signal line instead of using a special signal line adapted exclusively for the purpose of the control under discussion. In this case, the encodement may be in a parallel form or a serial form.

Further, the embodiment cited above represents a case of issuing a command to prepare for printing by the manipulation of the key 24 and, based on the command, starting the supply of electric power to the thermal fixing device 13. Optionally, the command to prepare for printing may be used as a cue for setting in motion a polygon scanner in a laser system or initiating conveyance of a recording paper 4 to a point directly preceding the printing position.

Figure 5:
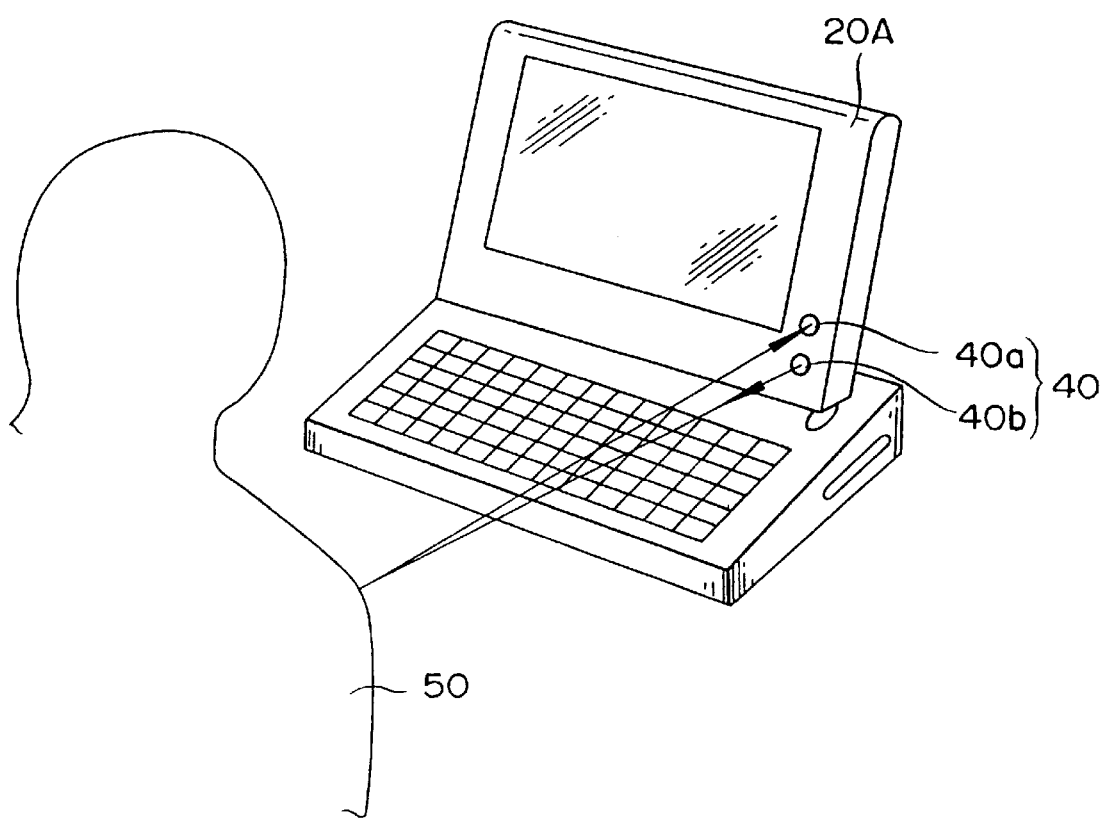
FIG. 5 is a schematic drawing illustrating another embodiment of this invention.

FIG. 5 illustrates another embodiment of this invention. In this embodiment, a notebook type computer 20A is provided with a human body sensor 40 which is composed of an infrared ray emitter 40a and an infrared ray receiver 40b. The computer 20A senses the approach of a user 50 on the basis of a signal from the human body sensor 40 and issues a command to prepare for printing.

The human body sensor 40 detects the human body (user 50) by independently detecting the amount of light received by the infrared ray receiver 40a, the interval between the time the infrared ray is emitted by the infrared ray emitter 40b and the time the infrared ray, after being reflected by the user 50, is returned to the infrared ray receiver 40a, and the change in this interval (a criterion for determining whether the user 50 is moving toward or away from the human body sensor 40) or combining at least two of these factors.

When the user 50 is detected as described above, the printer system assumes that the printer will be used and issues a command to prepare for printing and starts the supply of electric power to the thermal fixing device 13. The subsequent control is carried out in the same manner as illustrated in the flow chart of FIG. 3.

The embodiment cited above represents a case of adapting the human body sensor 40 for fulfilling the function of sensing the approach of the user 50 based on the infrared ray which is reflected on the human body. This particular adaptation is not critical for this invention. Alternatively, a focal type infrared ray sensor may be used for the detection of the infrared ray (heat) from the human body. Otherwise, an ultrasonic wave may be used instead of the infrared ray. For example, an ultrasonic wave sensor may be used for detecting the approach of the user based on the reflected wave.

As yet another means for detecting the human body, a weight sensor or a strain sensor may be attached to a chair and adapted to sense the fact that the user has sat on the chair. A strain sensor or an acceleration sensor may be attached to the keyboard or a desk and adapted to sense the fact that a force is exerted on the keyboard or the desk.

Figure 2:
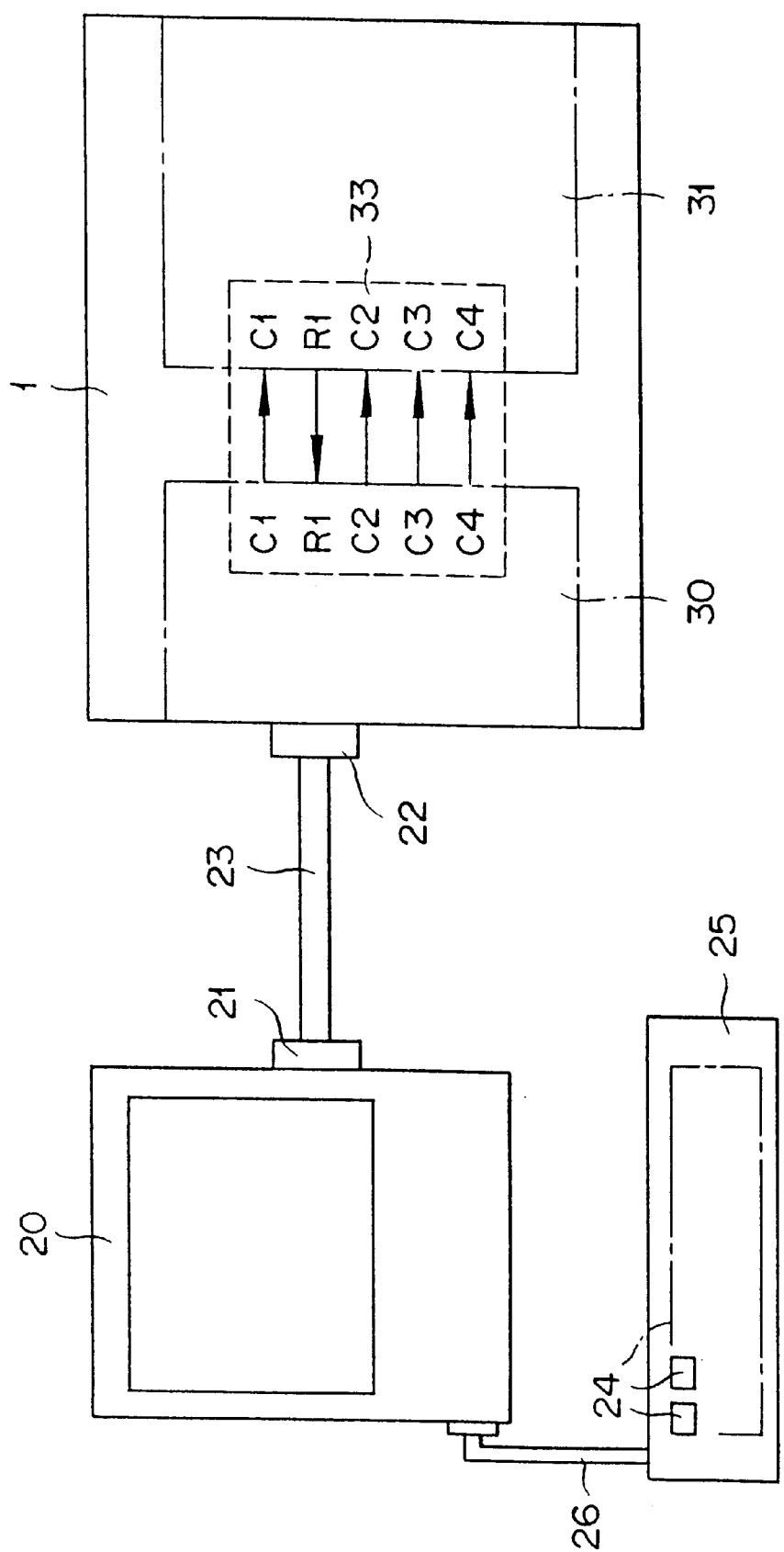
FIG. 2 is a schematic structural drawing illustrating a control system for a thermal fixing device in the printer system of this invention.

The use of such a sensor as mentioned above necessitates provision of a sensor circuit which is adapted exclusively for the purpose of detection under discussion. The printer system has entirely the same construction as illustrated in FIG. 2 except for the sensor and the sensor circuit. The effect of this sensor is identical with that of the human body sensor 40.

Figure 6:
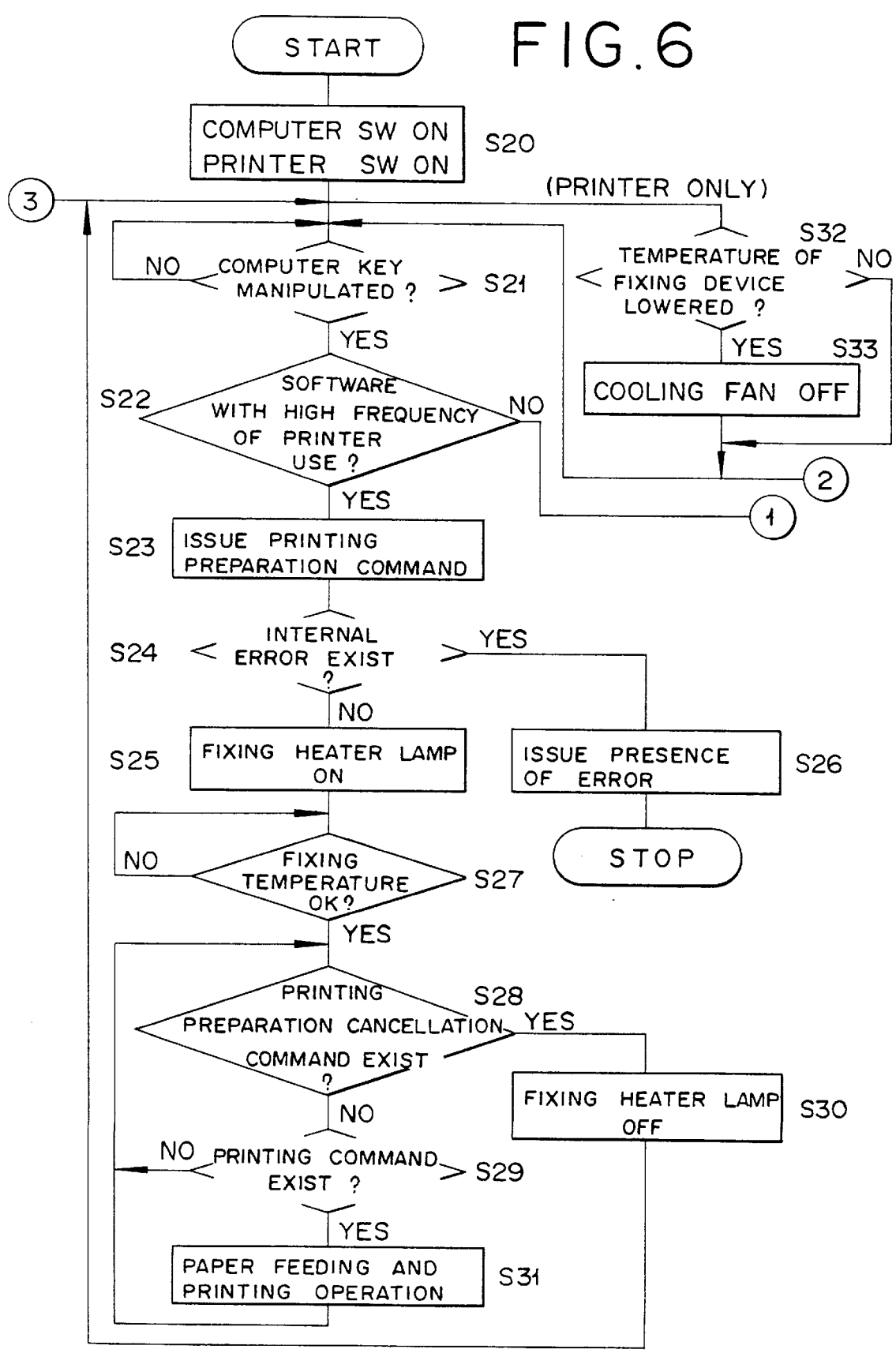
FIG. 6 is an operation flow chart illustrating yet another embodiment of this invention.
Figure 7:
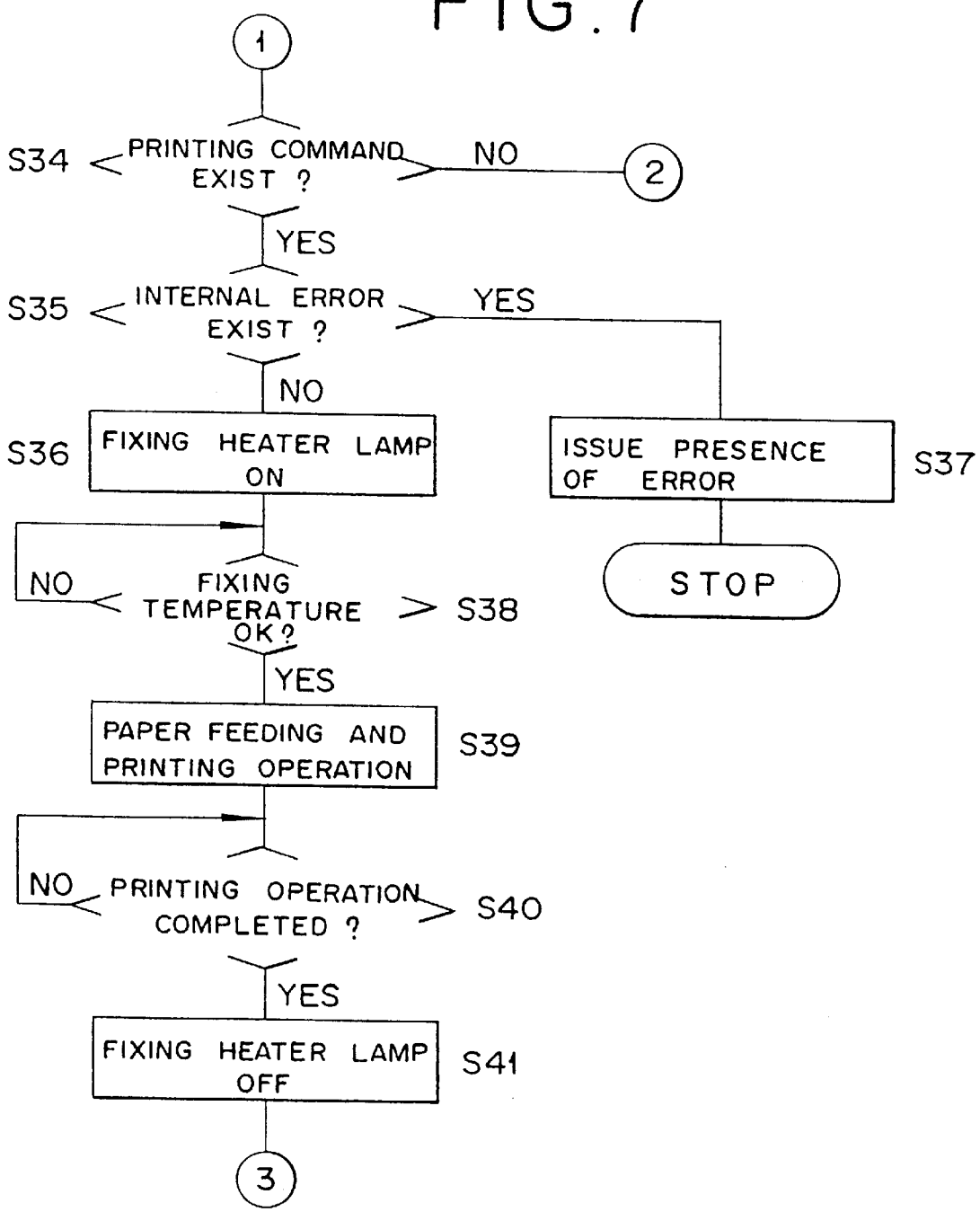
FIG. 7 is a flow chart continuing from the flow chart of FIG. 6.

FIG. 6 and FIG. 7 illustrate another example of the control of the thermal fixing device in the printer system of this invention. The present embodiment, unlike the embodiment of FIG. 3 in which a command to prepare for printing is issued only when the key 24 is manipulated, issues a command to prepare printing to the laser beam printer 1 when the user selects an application software which has high frequency of using the printer.

Specifically, the application softwares which are executed by the computer 20 are classified under two types, namely those of one type having high frequency of using the printer (such as, for example, word processing software and spread sheet software) and those of the other type having low frequency of using the printer (such as, for example, edit software and search software). The computer 20 issues a command to prepare for printing to the laser beam printer 1 only when the user has selected any of the softwares having high frequency of using the printer. In this case, the discrimination of application softwares by the magnitude of frequency of printer use can be fulfilled by the application user preparatorily registering the application software names under the two categories. Otherwise, the computer may be so programmed that the numbers of printing operations actually executed by individual application softwares are counted and the application softwares consequently found to have been used for executing such numbers of printing operations as exceed a stated number are automatically registered as those belonging to the category of high frequency of printer use.

The concrete details of the control are as shown in the flow charts of FIG. 6 and FIG. 7. The present embodiment differs from the embodiment of FIG. 3 basically in additionally involving the three steps of S22, S34, and S40. The other steps of this embodiment correspond to the component steps forming the flow chart of FIG. 3 and are omitted from the description to be given hereinbelow.

The computer 20, after recognizing the fact that the user has manipulated the key 24 on the keyboard 25 (S21), proceeds to judge whether or not the started application software belongs to the category of high frequency of printer use (S22). When the outcome of this judgment is "yes," the processing advances to the step S23 and thereafter effects entirely the same control as shown in FIG. 3. When the outcome of the judgment is "no," the processing advances to the step S34 and thereafter effects the same control (providing the fixing heater lamp is turned on when the heater lamp is in use and turned off when the heater lamp is no longer in use) as conventionally practiced. In short, the step S22 consists in discriminating whether the processing advances to the same control as shown in FIG. 3 or to the conventional control. In this embodiment, the user (or the menu vendor) is free to write a program like "CALL PREPARATION FOR PRINTING" in the menu of softwares of the computer 20 so as to execute the discrimination of S22 at a step for selection of an application software. One line to a few lines suffice to make this addition to the program.

When an application software having low frequency of printer use is selected, the computer proceeds to discriminate whether or not a command to print has been issued (S34). The command to print at S34 is issued when the user elects to produce a printing operation by the use of an application software of low frequency of printing. When this command to print is issued, the steps S35 through S39 are executed to turn on the fixing heater lamp, keep the operations of paper feeding and printing waiting until the temperature of the heater lamp reaches a stated fixing temperature, and thereafter start the printing operation in the same manner as shown in FIG. 3.

Then, the printer forms a judgment to decide whether or not the printing operation has been completed (S40) and, when the outcome of the decision is "yes," turns off the fixing heater lamp, sets the printer 1 in the "power saving mode" (S41), and awaits the next command.

In the present embodiment, the command to prepare for printing is issued when an application software having high frequency of printer use is elected. This embodiment, therefore, enjoys higher positivity of printer use and greater saving of electric power than the case of starting the supply of electric power to the thermal fixing device 13 only when the user manipulates the key 24 or the user sits in front of the computer 20. Further in the present embodiment, the addition to the program is inexpensive because only a few lines suffice for the addition.

Since the supply of electric power to the thermal fixing device 13 is started before the computer 20 issues a command to print or the print key is manipulated in the same manner as in the embodiment described formerly, the rise time of the thermal fixing device 13 is apparently curtailed and the waiting time is decreased in a large measure (note that the waiting time even ceases to exist when the command to prepare for printing is issued 10 to 30 seconds earlier). From the user's point of view, therefore, the printer appears to be capable of being used at once.

The magnitude of frequency with which application softwares use the printer can be freely altered by the user so as to suit his own choice. This advantage coupled with the various effects mentioned above contributes to exalt the convenience of use of the printer.

Figure 8:
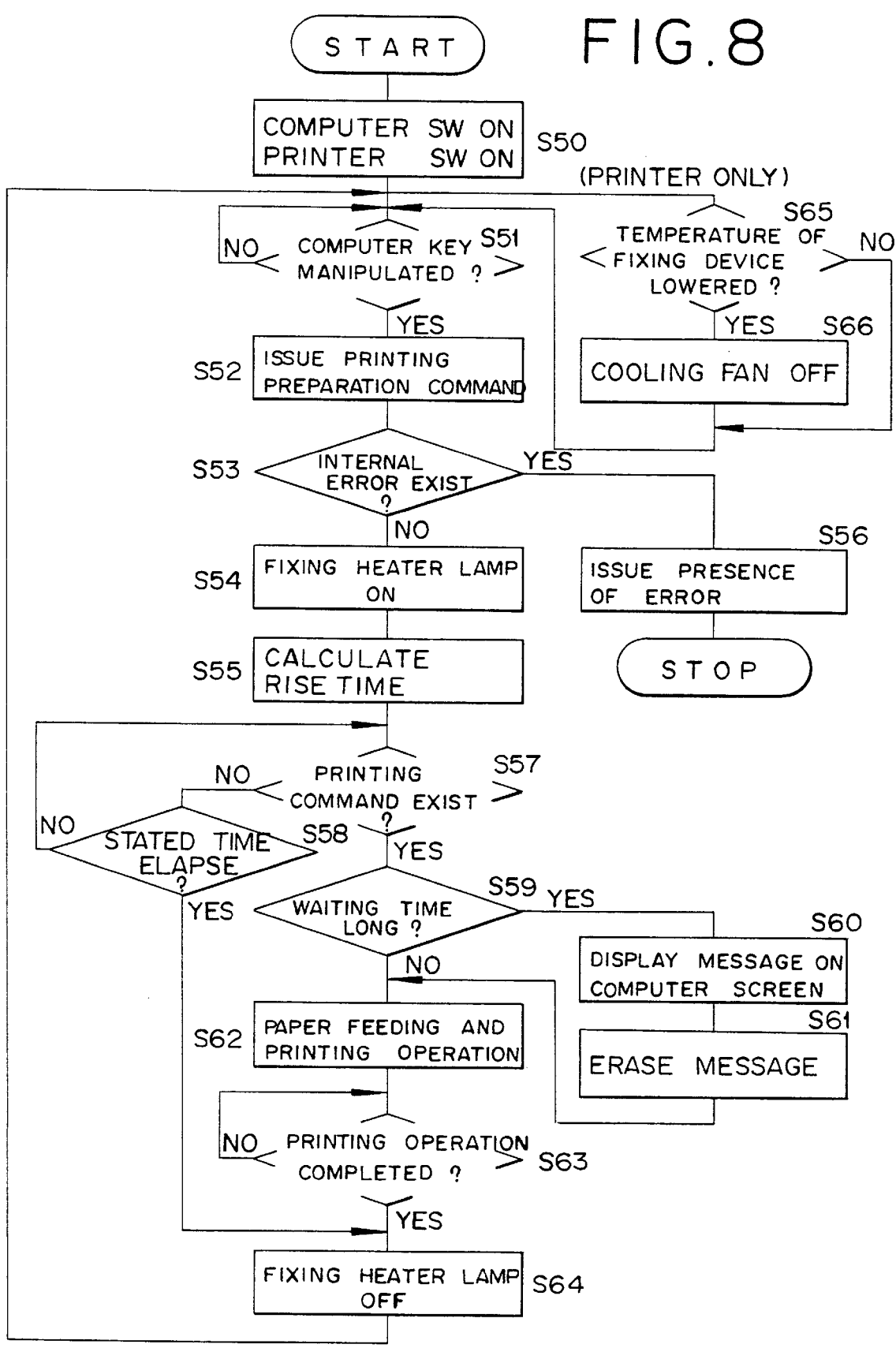
FIG. 8 is an operation flow chart illustrating still another embodiment of this invention.

FIG. 8 illustrates still another embodiment of this invention. This embodiment is so designed that when the computer 20 issues a command to prepare for printing to the laser beam printer 1, the laser printer 1 informs the computer 10 of the present status of the thermal fixing device 13 such as, for example, the rise time of the thermal fixing device 13 (the time required for the existing temperature to reach the stated fixing temperature), irrespectively of the user's will.

The construction of the present embodiment is completely identical with that of the embodiment of FIG. 2. The details of the control to be fulfilled in this embodiment are as shown in the flow chart of FIG. 8. Since this embodiment is based on the embodiment of FIG. 3, the common points which are shared by these two embodiments will be omitted from the following description. The following description, therefore, will be centered on only the points in which the present embodiment and the embodiment of FIG. 3 differ.

The laser beam printer 1, after the computer 20 has issued a command to prepare for printing and has confirmed the absence of an internal error in the printer (S52, S53), starts the supply of electric power to the thermal fixing device 13 and, at the same time, detects the current temperature of the thermal fixing device 13, calculates the time required for the detected temperature to reach the stated fixing temperature (namely the rise time), and transmits the outcome of this calculation to the computer 20 (S54, S55). Besides the ordinary arithmetic operation using numerical values which are based on the data of the rise time of the thermal fixing device 13 from the room temperature and the data of the detected temperature, the calculation at S55 may consist in preparing a table showing the relation between temperature and time, detecting the current temperature, and finding the rise time by looking up the table for the detected temperature. When the temperature sensor to be used happens to be a thermistor, for example, the temperature of the thermal fixing device 13 is detected in the form of the magnitude of voltage. In this case, therefore, it is practical to estimate the interval preceding the time at which the stated fixing temperature is reached with the aid of a table indicating the range between A volts and B volts by the interval of C seconds (wherein A, B, and C are constants). As a result, a simple program suffices for the operation of the laser beam printer.

Thereafter, the laser beam printer 1 waits for the issuance of a command to print from the computer 20 (S57). When no command to print is issued before the elapse of a stated time (such as, for example, 1 minute) (S58), the computer concludes that the user has no will to use a printer, proceeds to the step S64, and turns off the fixing heater lamp.

When a command to print has been issued, the computer 20 compares the rise time of the fixing heat lamp which is received at the step S55 with the stated time (such as, for example, 10 seconds) and forms a judgment to decide whether or not the rise time is longer than the stated time (S59). When the outcome of this judgment is "yes" (not less than 10 seconds), the computer 20 displays on the screen thereof a message reading "Wait a while until the printer is settled" (S60). This display given in part of the lower section of the screen suffices and ought to avoid interfering with the operation of the computer. As the waiting time preceding the time at which the fixing temperature is reached is decreased, the message on the screen is erased (S61). There is a possibility that the time for transfer of a given image from the computer 20 to the printer 1 and the time for execution of processing inside the printer 1 will be known in advance, depending on the complexity of the image with respect to which the computer 20 has issued a command to print. It is, therefore, desirable to form a judgment on the waiting time in consideration of such transfer time and processing time mentioned above. Thus, the rise time preceding the time at which the fixing temperature is reached is not always required to be identical with the waiting time.

When the fixing temperature is reached, the laser beam printer 1 starts feeding recording papers and initiates a printing operation, irrespective of the display on the computer 20 (S62). Then, the computer forms a judgment to decide whether or not the printing is to be continued, namely whether or not the printing is to be terminated (S63). When the completion of printing is chosen by this judgment, the computer turns off the fixing heater lamp (S64) and returns the processing to the step S51. When the continuation into a new printing is chosen by the judgment, the computer can start the new printing after only a brief waiting time because the temperature of the thermal fixing device 13 is still high.

Since the present embodiment enables the computer 20 to be informed of the current status of the laser beam printer 1 (the rise time of the thermal fixing device 13 in the present case), the laser beam printer 1 can manifest its maximum function. The computer 20 is so adapted as to discern the current status of the laser beam printer 1 (the rise time of the thermal fixing device 13) and, when the waiting time preceding the time at which the stated fixing temperature is reached is long, displays a message indicating this fact on the screen. The computer, therefore, is capable of immediately responding to a command to print which is to be issued by the user and consequently preventing the user from otherwise possible loss of time (with the result that the convenience will be exalted).

Since the operations mentioned above are fulfilled by an alteration of the program, the increase of cost due to the incorporation of these operations can be minimized.

The present embodiment is designed to inform the computer 20 of the current status of the laser beam printer 1 in the form of the information as to the rise time of the thermal fixing device 13. Optionally, it may be so designed as to inform the computer 20 of such additional factors as the interval between the time a recording paper 4 departs from the feed paper cassette 5 and the time the recording paper 4 reaches the position for starting the printing, tabular data of sizes of recording papers to be set in the cassette 5, the density of print and the conditions of printing selected for the immediate operation, and the optimum fixing conditions appropriate for the particular kind of a recording paper 4 to be used (such as, for example, wall thickness, roughness or smoothness of surface, envelope or plane sheet).

Further, the present embodiment is designed to enable the computer 20 to be informed of the current status of the thermal fixing device 13 after the computer 20 has issued a command to prepare for printing to the laser beam printer 1. Optionally, it may be altered so that the computer 20 will be informed of the current status of the thermal fixing device 13 before the laser beam printer 1 receives the command to prepare for printing.

Figure 9:
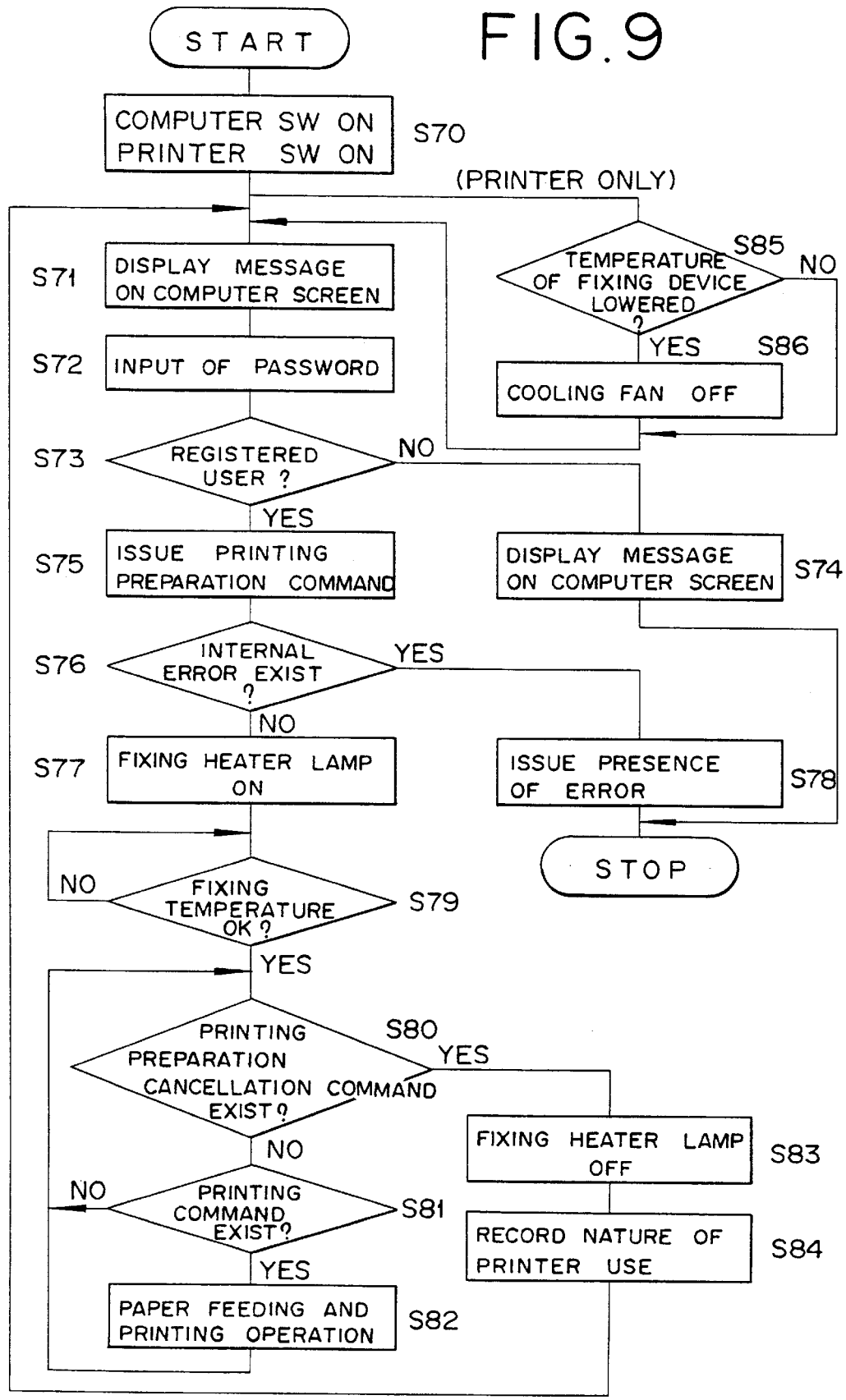
FIG. 9 is an operation flow chart illustrating a further embodiment of this invention.
Figure 10:
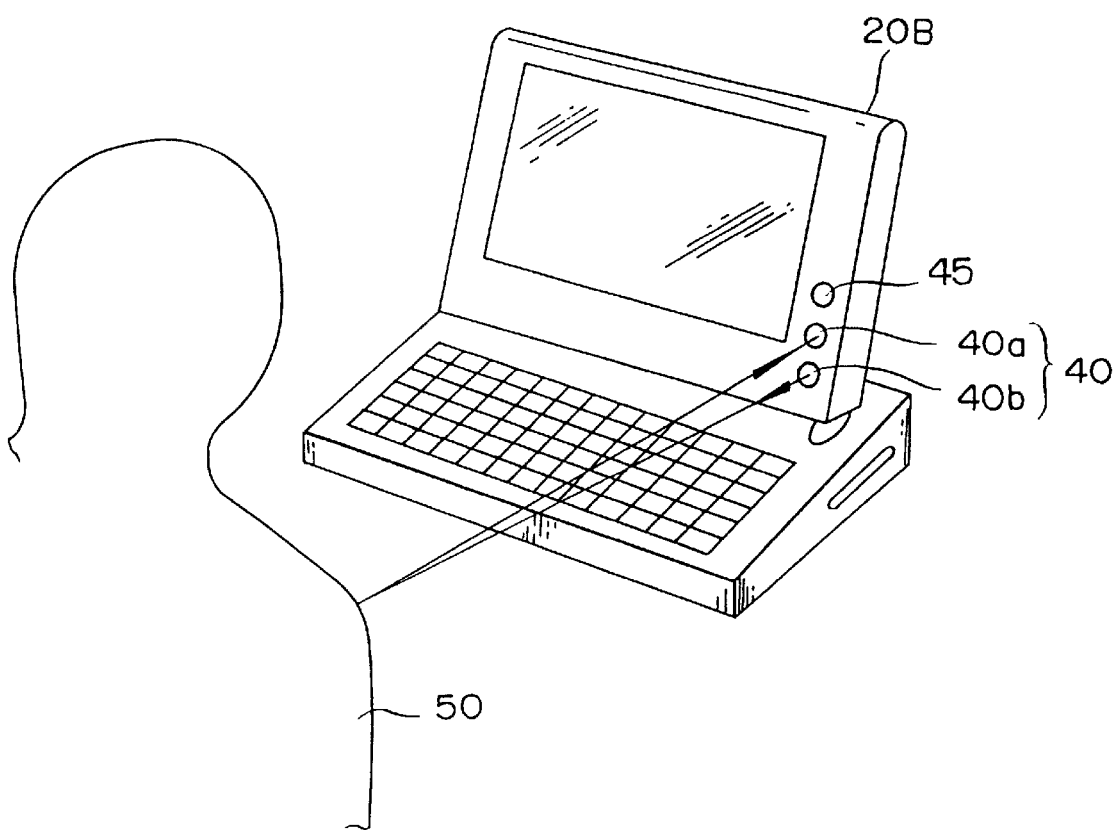
FIG. 10 is a schematic drawing illustrating still another embodiment of this invention.

FIG. 9, FIG. 10, and FIG. 11 illustrate still other embodiments of this invention. These embodiments are invariably designed to discharge the function of discerning users about to use the computer 20 and, only when they are identified as registered users, issuing a command to prepare for printing to the laser beam printer 1 besides the common function of this invention which resides in curtailing the apparent rise time of the thermal fixing device 13. Incidentally, the embodiment of FIG. 9 represents a case of attaining exclusive discernment of registered users by means of a password and the embodiment of FIG. 10 and FIG. 11 represents a case of effecting discernment of registered users by means of an image sensor.

Before these embodiments are specifically described, a method for preventing leakage of secrecy by the discernment of registered users will be outlined below. The computer 20 discerns a user who manipulates the keyboard 25 or who sits in front of the computer 20 and, when the user is identified as a registered user, issues a command to prepare for printing so as to heat the thermal fixing device 13 of the laser beam printer. When the discerned user is identified as a registered user, the computer 20 allows the operation and the printing to be carried out normally. If the discerned user is not identified as a registered user and if he attempts to gain access to a memory or data of a confidential nature, the computer 20 gives an alarm and inhibits the printer from operating. At this time, the computer 20 records the time at which the alarm is issued, the object of access, and the outline of the user. The data to be recorded for this purpose are handled in a specially devised manner such that the recorded data usually defy the user's attempt at tampering. For example, these data are stored in a distant recording device through the medium of a voice recorder, a radio wave, infrared ray, or light. Alternatively, the data are recorded in NOVRAM or an optical disc which is a device incapable of erasing the recorded data unless the device proper is broken. The means available for the recognition of a user include pattern recognition, fingerprints, voice prints, pulse rate, etc. besides a password and an ID card.

FIG. 9 represents a case of discerning a user by means of a password, depicting the control which is executed when the user inputs his password through a keyboard. The construction of the present embodiment is entirely identical with that of the embodiment shown in FIG. 2. Since the flow chart of FIG. 9 is based on the embodiment of FIG. 3, the common parts which are shared by these flow charts are omitted from the following description. The following description, therefore, is centered on the points in which the two embodiments differ.

When the power source for the computer 20 is turned on (S70), the computer 20 displays a message reading "Enter your password" on the screen (S71). Then, the user inputs his password through the keyboard 25 (S72). Preferably for the sake of safeguarding secrecy, these steps S71 and S72 are desired to be executed by the insertion of an ID card into the computer 20.

When the password is introduced, the computer 20 forms a judgment to decide whether or not the password is correct and discerns whether the user is a registered user or not (S73). When the user is identified as a registered user, the computer 20 issues a command to prepare for printing to the laser beam printer 1 so as to turn on the fixing heater lamp (S75). If the user is not identified as a registered user, the computer 20 displays a message reading "You are not registered" on the screen and discontinues the processing (S74). The discernment at the step S73 does not need to be limited to a mere discernment between presence/absence of registration but may be so elaborate as to effect discernment on each of the application softwares. This discernment may be so programmed that the user is free to view a display on the screen while the printer is allowed or not allowed to operate.

When the fixing heater lamp is turned off as by reason of completion of the printing operation, the computer 20 records the nature of the use of the printer such as the identity of the user, the time and date of the printer use, the selected application software, and the quantity of recording papers used (S84). A fixed memory is not the only means of storage for this record. Otherwise, the record is desired to be stored through a wireless or a wired path in an external memory device to which no easy access by a user is gained.

Since the operations described above can be fulfilled simply by a modification of program, the protection of confidential data against leakage is attained without any special addition to cost.

When the discernment of a user is effected by means of an ID card, mere addition of an ID card reader suffices to exalt the effect of preventing leakage of confidential data.

FIG. 10 and FIG. 11 represent a case of effecting the discernment of a user by means of an image sensor. The present embodiment presumes that users always carry their ID cards on their chests while discharging their duties. A notebook type computer 20B is provided with a human body sensor 40 and an image sensor 45 as illustrated in FIG. 10 and is enabled to detect and discern each user 50 based on the signals from the human body sensor 40 and the image sensor 45. The computer 20B and the laser beam printer 1 are turned on only when the user is identified as a registered user. The human body sensor 40, like what is used in the embodiment of FIG. 5, is composed of an infrared ray emitter 40a and an infrared receiver 40b. The image sensor 45 resembles a TV interphone provided with a CCD sensor, for example.

The flow chart of the control to be executed in the present embodiment is shown in FIG. 11. First, the computer 20B forms a judgment to decide whether or not the user 50 has gained access to the computer 20B based on the signal from the human body sensor 40 (S90). The precondition of this step is that the human body sensor 40 is always kept in a state capable of detection. When the user 50 is detected, the computer 20B sets the image sensor 45 into operation for discerning whether or not the user 50 is a registered user (S91). This discernment consists in reading the ID number on the ID card carried on the chest of the user 50 from the image data on the CCD and finding whether or not the ID number so read out conforms with any of the registered numbers. Besides the ID card numbers, the discernment can be attained by extraction of features of users' faces or by analysis of radio waves emitted from ID cards, for example. In the latter case, a radio receiver may be used in the place of the image sensor.

If the user 50 is identified as an unregistered user, the computer 20B turns on the main power source of the computer 20B, keeps a message reading "You are not registered" displayed for a stated time on the screen, then turns off the main power source, and returns the processing to the step S90 (S92). Conversely, when the user 50 is identified as a registered user, the computer 20B turns on the main power source of the computer 20B and the power source of the laser beam printer 1 at the same time (S93) and issues a command to prepare for printing to the laser beam printer 1 so as to turn on the fixing heater lamp (S94). The subsequent steps S95 to S102 are similar to those of the flow chart of FIG. 3, except the present embodiment incorporates the step S99 in the place of the step S8 shown in FIG. 3. To be specific, the computer 20B forms a judgment to decide whether or not the user 50 has completed the use of the computer 20B (S99) and, when the outcome of this judgment is "yes," turns off the fixing heater lamp (S102). The judgment at the step S99 is effected, for example, based on the question whether or not the absence of the manipulation of the key 24 has lasted for a stated minimum time.

When the fixing heater lamp is turned off, the computer 20B records the ID number of the user, the time and date of the use of the printer, the name of the software used, and the quantity of recording papers used for printing (S103) similarly to the step S84 of FIG. 9. Then, the computer 20B turns off the main power source of its own and the power source of the laser beam printer 1 at the same time and returns the processing to the step S90 (S104). When the discernment of users is effected by the use of the image sensor 45 as described above, the scenes of discernment are always conspicuous to persons engaging in business operations near the printer system. Thus, the protection of confidential data against leakage in the present embodiment can be attained more infallibly than in the embodiment effecting the discernment by the use of ID cards.

The discernment of users by the use of a radio transmitter and a radio receiver brings about inexpensively the same effect an the discernment using an image sensor.

What is claimed is:

1. A printer system comprising:
   a computer;
   a printer disposed separately of said computer and adapted to form an image on a recording paper in compliance with image data received from said computer; and
   recognizing means for recognizing a start of operation of said computer;
   said printer incorporating therein setting means for setting said printer in a state capable of producing a printing operation when the start of operation of said computer is recognized by said recognizing means;
   wherein said computer incorporates therein a sensor capable of detecting an approach of a user to said computer and said recognizing means recognizes the start of operation of said computer when said sensor detects the approach of said user to said computer;
   wherein said sensor comprises an infrared ray emitter and an infrared ray receiver.

2. A printer system comprising:
   a computer;
   a printer disposed separately of said computer and adapted to form an image on a recording paper in compliance with image data received from said computer; and
   recognizing means for recognizing a start of operation of said computer;
   said printer incorporating therein setting means for setting said printer in a state capable of producing a printing operation when the start of operation of said computer is recognized by said recognizing means;
   wherein said computer incorporates therein selection means for selecting a software to be executed and said recognizing means detects the start of operation of said computer when said software is selected.

3. A printer system according to claim 2, which further comprises discrimination means for discriminating the frequency with which the software selected by said selection means uses said printer, wherein said setting means sets said printer in a state capable of producing a printing operation when said discrimination means find said frequency to be high.

4. A printer system comprising:
   a computer;
   a printer disposed separately of said computer and adapted to form an image on a recording paper in compliance with image data received from said computer; and
   recognizing means for recognizing a start of operation of said computer;
   said printer incorporating therein setting means for setting said printer in a state capable of producing a printing operation when the start of operation of said computer is recognized by said recognizing means;
   wherein said setting means incorporates therein electric power supply means for supplying electric power to image forming means of said printer and said setting means initiates supply of electric power by said electric power supply means when the start of operation of said computer is recognized by said recognizing means;
   wherein said printer comprises means for forming a toner image on a recording paper in compliance with said image data and a fixing device for heating said toner image and fixing it on said recording paper and said setting means initiates the supply of electric power by said electric power supply means to said fixing device when the start of operation of said computer is recognized by said recognizing means; and
   wherein said printer system further comprises means for displaying the interval between the time the supply of electric power is started by said electric power supply means and the time the temperature of said fixing device reaches a stated level.

5. A printer system comprising:
   a computer;
   a printer disposed separately of said computer; and
   assuming means for assuming the presence or absence of the scheduled use of said printer by said computer;
   said computer comprising means for transmitting image data to said printer; and
   said printer comprising:
      image forming means for forming a toner image on a recording paper in compliance with image data transmitted from said computer;

a fixing device for heating said toner image and fixing it on said recording paper;

electric power supply means for supplying electric power to said fixing device; and control means for controlling said electric power supply means so as to initiate supply of electric power when said assuming means assumes the presence of the scheduled use of said printer before said image data are received;

wherein said computer incorporates therein a sensor for detecting the approach of a user to said computer and said assuming means assumes the presence of the scheduled use of said printer when said sensor detects the approach of a user; and wherein said sensor comprises an infrared ray emitter and an infrared ray receiver.

6. A printer system comprising:

a computer;

a printer disposed separately of said computer; and assuming means for assuming the presence or absence of the scheduled use of said printer by said computer;

said computer comprising means for transmitting image data to said printer; and said printer comprising:

image forming means for forming a toner image on a recording paper in compliance with image data transmitted from said computer;

a fixing device for heating said toner image and fixing it on said recording paper;

electric power supply means for supplying electric power to said fixing device; and control means for controlling said electric power supply means so as to initiate supply of electric power when said assuming means assumes the presence of the scheduled use of said printer before said image data are received;

wherein said computer incorporates therein selection means for selecting a software to be executed and said assuming means assumes the presence of the scheduled use of said printer in compliance with the selected software.

7. A printer system according to claim 6, which further comprises discrimination means for discriminating the frequency with which the software selected by said selection means uses said printer, wherein said assuming means assumes the presence of the scheduled use of said printer only when said discrimination means find said frequency to be high.

8. A printer system comprising:

a computer;

a printer disposed separately of said computer; and assuming means for assuming the presence or absence of the scheduled use of said printer by said computer;

said computer comprising means for transmitting image data to said printer; and said printer comprising:

image forming means for forming a toner image on a recording paper in compliance with image data transmitted from said computer;

a fixing device for heating said toner image and fixing it on said recording paper;

electric power supply means for supplying electric power to said fixing device; and control means for controlling said electric power supply means so as to initiate supply of electric power when said assuming means assumes the presence of the scheduled use of said printer before said image data are received;

wherein said computer incorporates therein discerning means for discerning users and, when said assuming means assumes the presence of the scheduled use of said computer, said control means controls said electric power supply means so as to initiate supply of electric power only on the condition that the user discerned by said discerning means is identified as a stated user.

9. A printer system according to claim 8, wherein said computer is provided with means for introducing a password and said discerning means discerns a user based on the introduced password.

10. A printer system according to claim 8, wherein said computer is provided with an image sensor for photographing a user and said discerning means discerns the user based on the image photographed by said image sensor.

* * * * *